(12) United States Patent
Bell

(10) Patent No.: US 10,720,763 B2
(45) Date of Patent: Jul. 21, 2020

(54) DISTRIBUTION PANEL WITH WIRE LOCKING FRAME AND METHOD OF USING SAME

(71) Applicant: Furrion Property Holding Limited, Hong Kong (HK)

(72) Inventor: Steven Neill Bell, The Peak (HK)

(73) Assignee: Furrion Property Holding Limited, Hong Kong (HK)

( * ) Notice: Subject to any disclaimer, the term of this patent is extended or adjusted under 35 U.S.C. 154(b) by 0 days.

(21) Appl. No.: 16/148,827

(22) Filed: Oct. 1, 2018

(65) Prior Publication Data

US 2020/0106251 A1 Apr. 2, 2020

(51) Int. Cl.
*H02G 3/16* (2006.01)
*H02G 3/08* (2006.01)

(52) U.S. Cl.
CPC .............. *H02G 3/16* (2013.01); *H02G 3/083* (2013.01)

(58) Field of Classification Search
CPC ....................................................... H02G 3/16
USPC ......................................................... 174/520
See application file for complete search history.

(56) References Cited

U.S. PATENT DOCUMENTS

| | | | | |
|---|---|---|---|---|
| 5,787,719 A | * | 8/1998 | Wilson ................... | A01K 63/02 296/22 |
| 6,095,670 A | * | 8/2000 | Vosika .................... | F21V 21/02 362/368 |
| 6,132,070 A | * | 10/2000 | Vosika .................... | F21V 21/02 362/368 |
| 6,169,340 B1 | * | 1/2001 | Jones ...................... | H02J 9/066 307/64 |
| 6,757,589 B1 | * | 6/2004 | Parker ................. | F16K 37/0075 137/624.11 |
| 8,253,043 B1 | * | 8/2012 | Kiely ................... | H02G 3/0616 174/650 |
| 2009/0014210 A1 | * | 1/2009 | Forbis ...................... | H02G 3/32 174/480 |
| 2012/0061137 A1 | * | 3/2012 | Temblador ............. | H02G 3/085 174/559 |
| 2015/0237752 A1 | * | 8/2015 | Craig ................... | H05K 5/0247 174/535 |

* cited by examiner

*Primary Examiner* — Stanley Tso

(74) *Attorney, Agent, or Firm* — Faegre Drinker Biddle & Reath LLP

(57) ABSTRACT

A distribution panel contains a housing defining a hollow interior having a back panel with a plate configured to be mounted thereto, where the frame is either slidable relative to the back panel and has an open position and a closed position, or includes a portion of a wire-holding mechanism and is configured to be coupled to the back panel, which includes another portion of the wire-holding mechanism.

17 Claims, 7 Drawing Sheets

DISTRIBUTION PANEL WITH WIRE LOCKING FRAME AND METHOD OF USING SAME

TECHNICAL FIELD

The present invention relates generally to a distribution panel.

BACKGROUND

Distribution panels may receive and hold multiple electrical wires. In order to secure the multiple electrical wires in place, wire organizers have been developed. Typical wire organizers have wire-holding mechanisms that allow the wires to generally move in one direction only. As such, once the electrical wires are inserted, one cannot easily slide the wires back out, and oftentimes this cannot be done without actually cutting the wires. This causes inconvenience and adds to the costs when the wiring needs to be redone or replaced.

Further, in a cramped space, such as a boat or a recreational vehicle (RV), where space is at a premium, it may be difficult to install a distribution panel and/or to replace wires and related devices.

Accordingly, there is a need for a distribution panel that is easy to install and at the same time allows for both easy locking and releasing of the multiple electrical wires that a distribution panel receives.

SUMMARY

Embodiments include a distribution panel including a housing defining an interior. The housing has a back wall having at least a portion of a wire-holding mechanism disposed to pass an electrical wire therethrough into the interior of the distribution panel and to hold in place the electrical wire; an aperture defined in the back wall and configured to allow the electrical wire to pass therethrough into the interior; a front wall opposite the back wall; a top wall attached to the front wall and the back wall; a bottom wall opposite the top wall and attached to the front wall and the back wall; a left wall attached to the top wall, the back wall, and the front wall; a right wall opposite the left wall and attached to the top wall, the back wall, and the front wall; and a plate configured to be mounted to the back wall, the plate comprising an opening which is configured to align with the at least a portion of the wire-holding mechanism. A circuit element may be disposed within the housing.

Without intending to be limited by theory, it is believed that the present invention provides a simple, cost effective distribution panel that may, for example, hold multiple electrical wires at once and is easy to install. Such a distribution panel also allows one to easily replace or adjust the wires inside the distribution panel without the need to cut the wires, whereby reducing both the cost and the hassle when the wiring needs to be replaced or redone. It also prevents damaging the wires, and adds an extra layer of security which makes the installation less prone to mistakes. The benefits of such a distribution panel are especially useful in cramped and otherwise space-constrained locations, such as, for example, a vehicle.

Another aspect of the present invention is a method of securing an electrical wire to a distribution panel. The method includes the steps of providing a distribution panel according to the present invention and putting the plate of the distribution panel in the open position. Then an electrical wire is provided and passes through the opening of the frame and the wire-holding mechanism, followed by sliding the plate relative to the back panel to the closed position, whereby a side of the opening pushes the electrical wire against the wire-holding mechanism to lock the electrical wire in place. The plate is then fixed at the closed position.

A further aspect of the present invention is an electrical device having a distribution panel according to the present invention.

A yet further aspect of the present invention is a vehicle having the distribution panel according to the present invention. The vehicle may be a recreational vehicle, a boat, a camper, an airplane, a drone, a household application and/or an industry equipment.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

Figure 1:
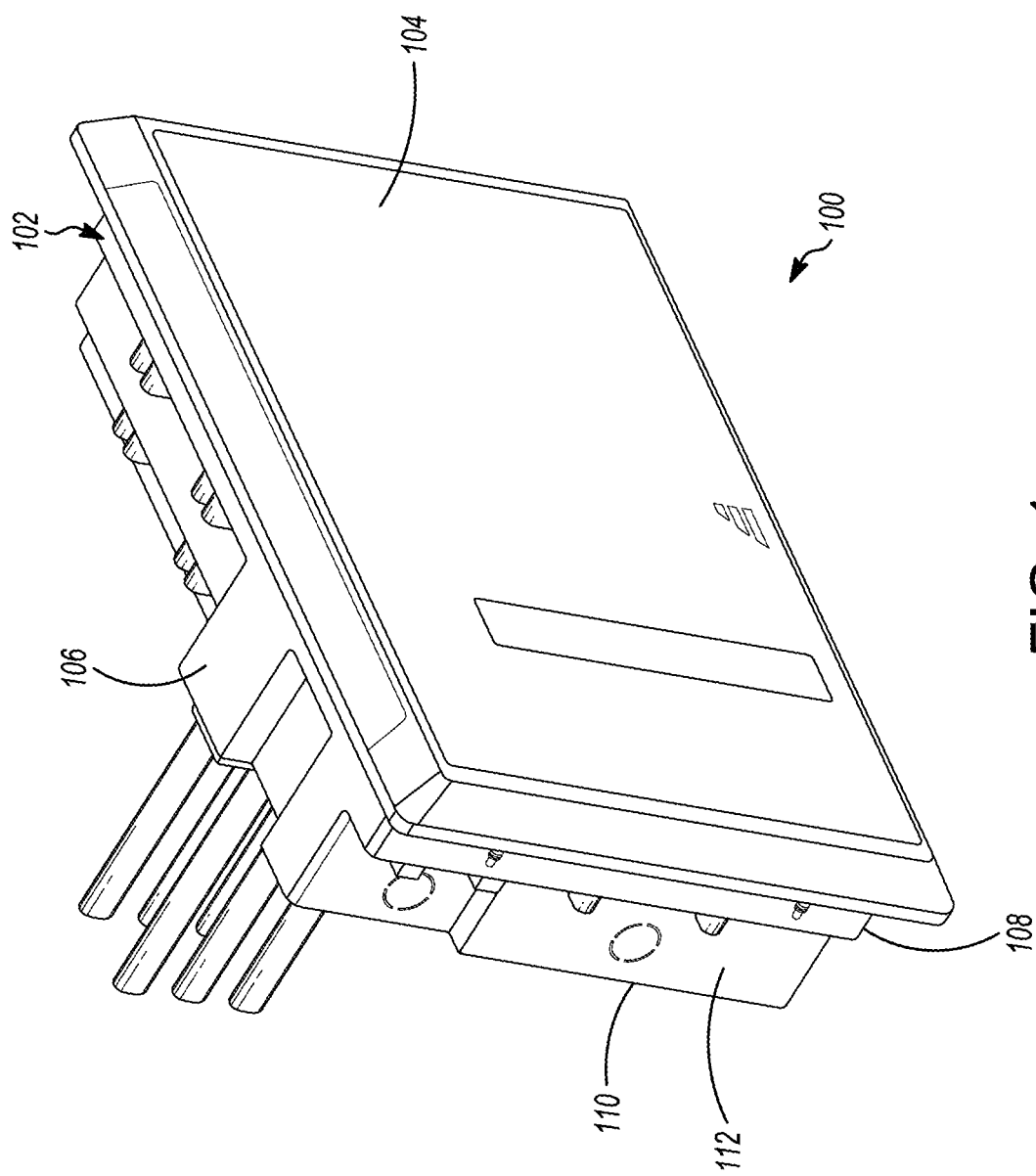
FIG. 1 is a front perspective view of an illustrative distribution panel, in accordance with embodiments of the invention.

While the disclosed subject matter is amenable to various modifications and alternative forms, specific embodiments have been shown by way of example in the drawings and are described in detail below. The intention, however, is not to limit the subject matter disclosed herein to the particular embodiments described. On the contrary, the disclosure is intended to cover all modifications, equivalents, and alternatives falling within the scope of the subject matter disclosed herein, and as defined by the appended claims. Additionally, drawings may not necessarily be to scale.

As used herein in association with values (e.g., terms of magnitude, measurement, and/or other degrees of qualitative and/or quantitative observations that are used herein with respect to characteristics (e.g., dimensions, measurements, attributes, components, etc.) and/or ranges thereof, of tangible things (e.g., products, inventory, etc.) and/or intangible things (e.g., data, electronic representations of currency, accounts, information, portions of things (e.g., percentages, fractions), calculations, data models, dynamic system models, algorithms, parameters, etc.), "about" and "approximately" may be used, interchangeably, to refer to a value, configuration, orientation, and/or other characteristic that is equal to (or the same as) the stated value, configuration, orientation, and/or other characteristic or equal to (or the same as) a value, configuration, orientation, and/or other characteristic that is reasonably close to the stated value, configuration, orientation, and/or other characteristic, but that may differ by a reasonably small amount such as will be understood, and readily ascertained, by individuals having ordinary skill in the relevant arts to be attributable to measurement error; differences in measurement and/or manufacturing equipment calibration; human error in reading and/or setting measurements; adjustments made to optimize performance and/or structural parameters in view of other measurements (e.g., measurements associated with other things); particular implementation scenarios; imprecise adjustment and/or manipulation of things, settings, and/or measurements by a person, a computing device, and/or a machine; system tolerances; control loops; machine-learning; foreseeable variations (e.g., statistically insignificant variations, chaotic variations, system and/or model instabilities, etc.); preferences; and/or the like.

The terms "up," "upper," and "upward," and variations thereof, are used throughout this disclosure for the sole purpose of clarity of description and are only intended to refer to a relative direction (i.e., a certain direction that is to be distinguished from another direction), and are not meant to be interpreted to mean an absolute direction. Similarly, the terms "down," "lower," and "downward," and variations thereof, are used throughout this disclosure for the sole purpose of clarity of description and are only intended to refer to a relative direction that is at least approximately opposite a direction referred to by one or more of the terms "up," "upper," and "upward," and variations thereof. Similarly, the terms "front" and "left," and variations thereof, are used throughout this disclosure for the sole purpose of clarity of description and are only intended to refer to a relative direction that is at least approximately opposite a direction referred to by one or more of the respective terms "back" and "right," and variations thereof. Additionally, a "set," "subset," or "group" of items (e.g., inputs, algorithms, data values, etc.) may include one or more items, and, similarly, a subset or subgroup of items may include one or more items. A "plurality" means more than one.

DESCRIPTION OF THE PREFERRED EMBODIMENTS

Embodiments of the present invention relate to a distribution panel including a housing defining a hollow interior. The housing has a back panel, a front panel, a top panel, a bottom panel, a left panel and a right panel. The front panel is opposite the back panel, while the top panel is attached to the front panel and the back panel. The bottom panel is opposite the top panel and attached to the front panel and the back panel. The left panel is attached to the top panel, the back panel, and the front panel while the right panel is opposite the left panel and attached to the top panel, the back panel, and the front panel. The back panel contains a wire-holding mechanism disposed to pass an electrical wire therethrough into the interior of the distribution panel and to hold in place the electrical wire. The housing contains a circuit element and a plate. In embodiments, the plate is configured to be mounted on the back panel and contains an opening which substantially aligns with the wire-holding mechanism. In embodiments, the plate is slidable relative to the back panel, and has an open position and a closed position. When the plate is in the open position the electrical wire is movable within the wire-holding mechanism and when the frame is in the closed position the electrical wire is locked in place.

In other embodiments, the plate includes a portion of the wire-locking mechanism and is configured to be coupled to the back panel, which includes another portion of the wire-locking mechanism. Upon coupling the plate to the back panel, the two portions of the wire-locking mechanism are positioned adjacent one another, thereby retaining the wire. In embodiments, the wire may be positioned through an aperture on the plate before coupling the plate to the back panel.

In an embodiment herein, the front panel may include; or itself actually be, a door. Typically this may be a door which pivots on one or more hinges so as to be openable by a user (e.g., the owner or an electrician) in order to perform maintenance, change fuses, reset circuit breakers, and/or the like. As such the door may further contain, for example, a lock, a locking mechanism, a handle, a label, a transparent window through which the status inside the distribution panel can be observed, an AC receptacle that is rated for 15 or 20 Amps, and/or a combination thereof.

In embodiments, when the plate is in the closed position, the plate locks the electrical wire in position by having a side of the opening pushing against the wire-holding mechanism, such that the electrical wire is no longer movable within the wire-holding mechanism.

In embodiments, the plate slides relative to the back panel by having two slots or more on opposite sides thereof, and slides along the two or more slots. The plate may be mounted to the back panel by, for example, placing screws running through the corresponding slots.

In an embodiment herein, the wire-holding mechanism is a strain relief. Without intending to be limited by theory, it is believed that the strain relief reduces strain and/or distributes strain over a greater area so as to reduce cracks, breaks, and/or other damage to, for example, electrical cables. Such a feature is especially useful in, for example a vehicle as the movement of the vehicle can cause movement of electrical components, wires, etc. which a house or other fixed structure does not typically encounter.

In embodiments, the distribution panel may be, for example, a fuse box, a circuit breaker box, a DC distribution panel with a light-emitting diode (LED) indicator and a combination thereof. In embodiments, the distribution panel may further include a feature such as a removable plug, a grounding wire, a door, a lock, a terminal bar for AC and DC grounding. The plate may be made of a plastic, a metal, rubber and/or a combination thereof.

In an embodiment of the present invention, the circuit element may be a fuse holder, a fuse, a circuit breaker, an input/output connector, or an alarm signal, a light-emitting diode (LED), a DC distribution panel, an AC receptacle that is rated for 15 or 20 Amps, a ground bar, and/or a combination thereof.

Without intending to be limited by theory, it is believed that the distribution panel herein may especially be useful in, for example, a vehicle, especially a large vehicle. A vehicle is subject to motion, acceleration, etc. forces that a structure such as a house, building, etc. is typically not subjected to. Therefore, the distribution panel herein may especially be useful in a larger vehicle such as, for example, a recreational vehicle, a boat, a camper, an airplane, a drone, an industrial vehicle, etc. which may contain multiple electrical connections requiring securing, and yet may also may be subjected to movement, vibrations, acceleration and deceleration, etc. Further, a distribution panel of the present invention can have both AC and DC distribution functions that can meet the requirement of a recreational vehicle.

In embodiments, the distribution panel herein is installed within a building; or a residence; such as an apartment, a house, a business, a shopping mall, a warehouse, etc.

Embodiments of the present invention also relate to a method of securing an electrical wire to a distribution panel. The method includes the step of providing a distribution panel according to the present invention where the plate is in the option position. In the case where the plate is not already in the open position, then the method herein further includes the step of placing the plate of the distribution panel in the open position. The method also includes the steps of providing an electrical wire and passing the electrical wire through the opening of the plate and the wire-holding mechanism. This is followed by the step of sliding the plate relative to the back panel to the closed position, whereby a side of the opening pushes the electrical wire against the wire-holding mechanism to lock the electrical wire in place. The plate is then fixed at the closed position.

In an embodiment herein, the method may further include the step of adjusting a position of the electrical wire when the plate is in the open position and after passing the electrical wire through the opening and the wire-holding mechanism, and/or connecting the electrical wire to a circuit element of the distribution panel.

Figure 2:
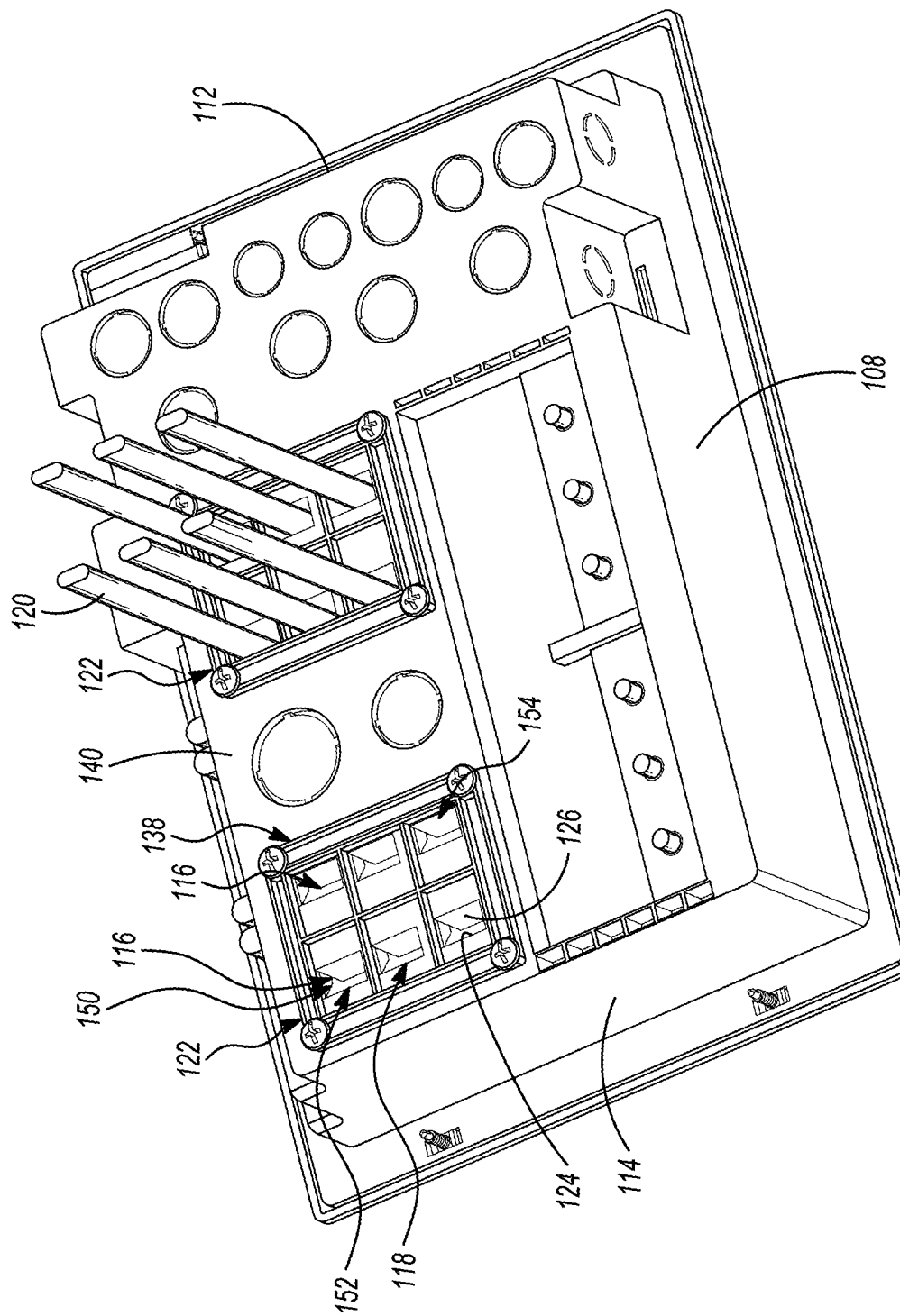
FIG. 2 is a rear perspective view of the distribution panel of FIG. 1, in accordance with embodiments of the invention.

FIGS. 1 and 2 are perspective views of a distribution panel 100, in accordance with embodiments of the invention. As shown, the distribution panel 100 includes a housing 102, having a front panel 104, a top panel 106, a bottom panel 108, a back panel 110, a left panel 112 and a right panel 114. According to embodiments, one or more of the panels 104, 106, 108, 110, 112, and 114 (which may be referred to herein, interchangeably, as walls—which is to be distinguished from the use of the word "panel" in the phrase "distribution panel," which refers to the device as a whole) may be separate panels, integrated with one or more of the other panels, and/or the like. For example, in embodiments, the top wall 106, bottom wall 108, back wall 110, left wall 112, and right wall 114 may be integrated as a single piece (e.g., a molded piece) that is configured to be coupled to the front wall 104 to form the housing 102. The housing 102 encloses an interior of the distribution panel 100, and one or more circuit elements may be disposed within the interior of the housing 102. In embodiments, the one or more circuit elements may include, for example, a fuse holder, a fuse, a circuit breaker, an input/output connector, an alarm signal, a LED, a DC distribution panel, an AC receptacle (e.g., an AC receptacle that is rated for 15 or 20 Amps), a ground bar, and/or the like.

According to embodiments, the back wall 110 includes one or more apertures 116 configured to provide a path from outside the housing 102 to the interior of the distribution panel 100. A wire-holding mechanism 118 may be disposed at or within each aperture 116. According to embodiments, the wire-holding mechanism 118 may be configured to hold an electrical wire 120 in place, while allowing a portion of the electrical wire 120 to pass through the aperture 116 into the interior of the distribution panel 100. In embodiments, the wire-holding mechanism 118 may include a strain relief, as shown. A person of ordinary skill in the art would understand that there could be any number of wire-holding mechanisms 118. A person of ordinary skill in the art would also understand that a wire-holding mechanism 118 may be configured according to forms other than a strain relief. That is, for example, a wire-holding mechanism 118 may include a hole, a one-way valve, a clamp, a clip, and/or the like.

Figure 3:
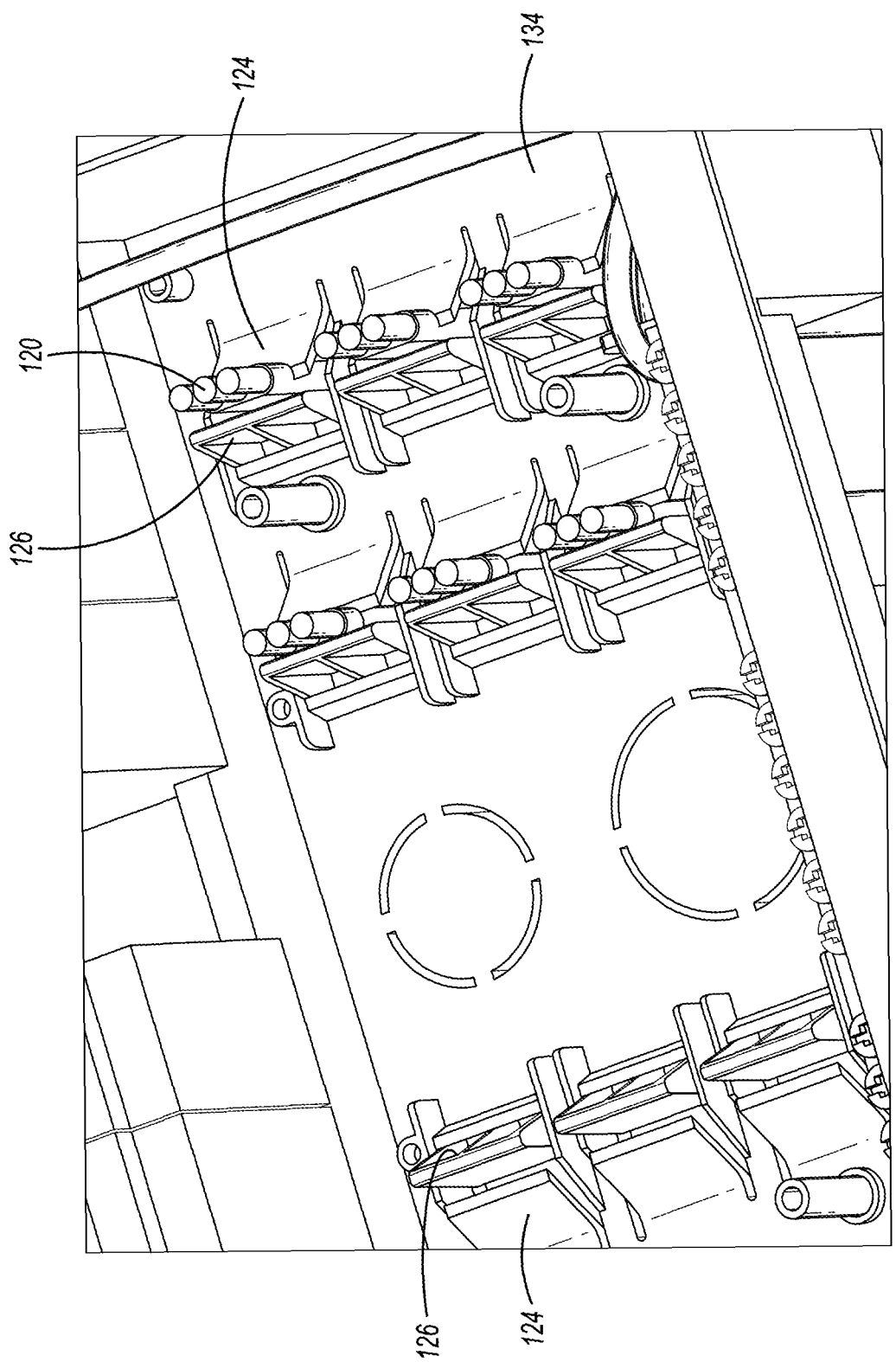
FIG. 3 is a close-up perspective view of a portion of the distribution panel of FIGS. 1 and 2, in accordance with embodiments of the invention.
Figure 4:
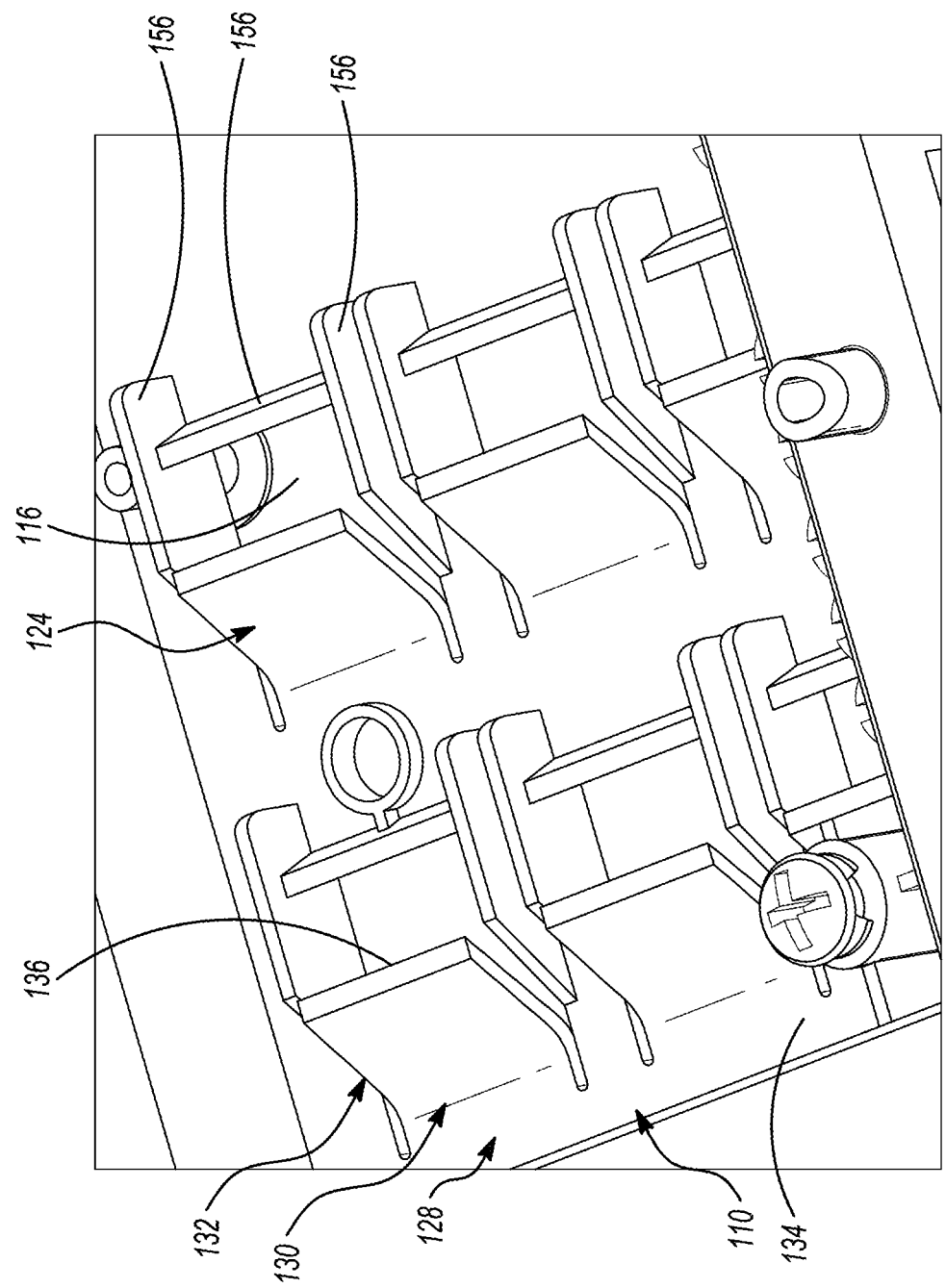
FIG. 4 is a close-up perspective view of a portion of a back wall of the distribution panel of FIGS. 1-3, in accordance with embodiments of the invention.
Figure 5:
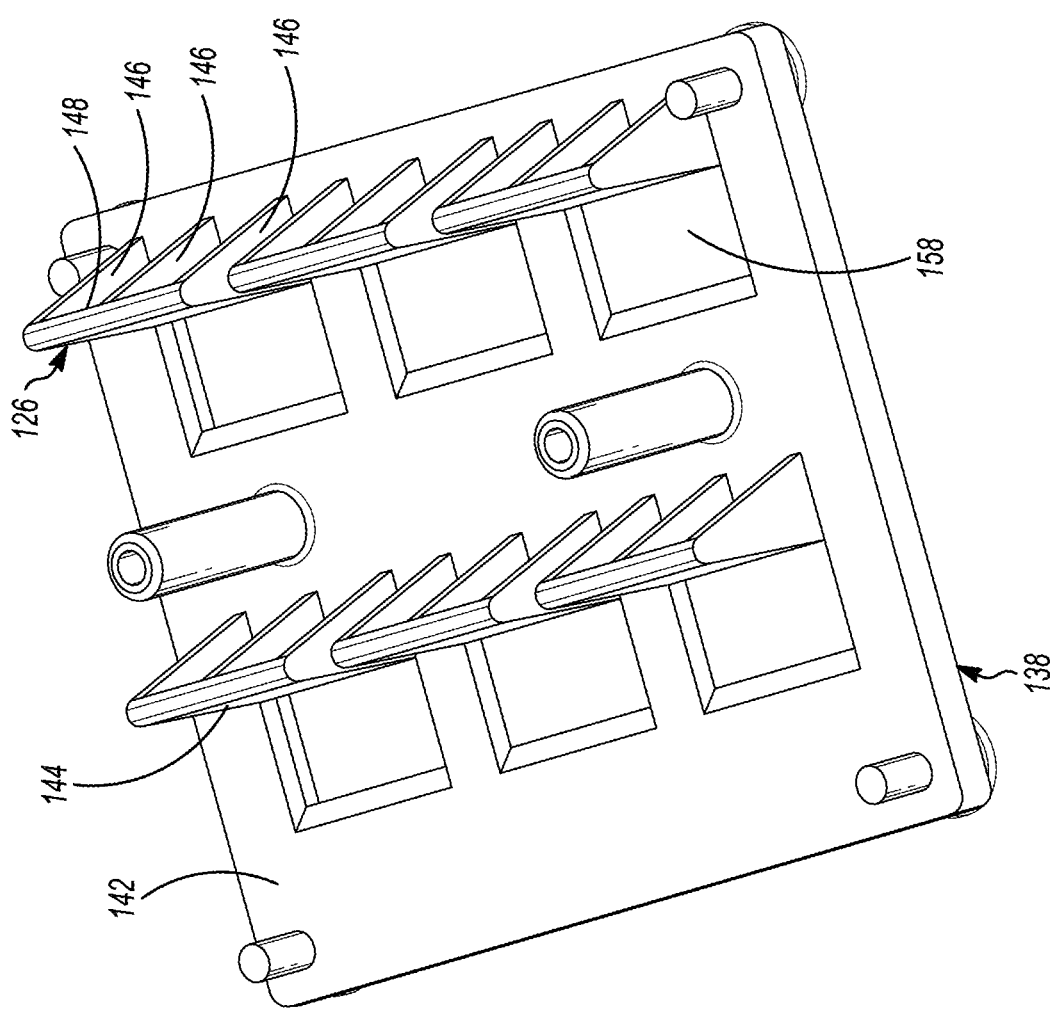
FIG. 5 is a close-up perspective view of a portion of a plate of the distribution panel of FIGS. 1-4, in accordance with embodiments of the invention.

Embodiments of the wire-holding mechanism 118 are illustrated in FIGS. 2-5. FIG. 3 is a perspective view of a portion of the distribution panel 100 from within the interior thereof, showing a number of wire-holding mechanisms 118, in accordance with embodiments of the invention. FIGS. 4 and 5 are close-up perspective views of a portion of the distribution panel 100, showing components of wire-holding mechanisms 118, in accordance with embodiments of the invention. As shown, the distribution panel 100 may include one or more sets 122 of wire-holding mechanisms 118. Each wire-holding mechanism 118 of a set 122 includes a first clip 124 and a second clip 126, configured to be positioned proximate on another, as shown, to pinch the electrical wire 120, holding it in place.

In embodiments, as shown in FIGS. 2-4, for example, the first clip 124 may be a tab defined in the back wall 110, and extending at least partially inwardly (toward the interior of the distribution panel 100, away from the exterior of the distribution panel 100). In embodiments, the tab may be coupled to the back wall 110, while in other embodiments, the tab may be integrated with the back wall 110. As shown, the first clip 124 may include a first portion 128 at least approximately parallel to the back wall 110, a bend 130, and a second portion 132 extending inwardly from the bend 130, away from an inner surface 134 of the back wall 110. In embodiments, for example, the first clip 124 may be configured to extend away from the back wall 110 at an angle (e.g., where the angle between an outer surface 136 of second portion 132 of the first clip 124 and the inner surface 134 of the back wall 110 is between approximately 25 degrees and 60 degrees).

The first clip 124 may be configured to be flexible enough to be displaced by an electrical wire enough to facilitate holding the electrical wire in place. That is, for example, the first clip 124 may be flexible but biased toward its original position so that, as an electrical wire is inserted, the wire pushes the first clip 124 out of the way enough so that the electrical wire can be disposed through the aperture 116, and is held in place by the tendency of the first clip 124 to return to its original position. In embodiments, the second clip 126 may additionally, or alternatively, be flexible to facilitate insertion of the electrical wire.

As shown, for example, in FIGS. 2, 3, and 5, the second clip 126 may be a tab defined in a plate 138 that is configured to be removeably coupled to an outside surface 140 of the back wall 110. The second clip 126 may be configured to extend away from an inner surface 142 of the plate 138 such that an outer surface 144 of the second clip is at least approximately perpendicular to the inner surface 142 of the plate 138. In embodiments, the outer surface 144 of the second clip 126 may extend away from the inner surface 142 of the plate 138 at an angle of between approximately 60 degrees and 115 degrees. In embodiments, the tab may be coupled to the back wall 110, while in other embodiments, the tab may be integrated with the back wall 110. As shown in FIG. 5, the second clip 126 may include one or more reinforcing members 146 extending between an inner surface 148 of the second clip 126 and the inner surface 142 of the plate 138, and configured to provide structural reinforcement to the second clip 126, thereby, in embodiments, facilitating minimizing displacement of the second clip 126 in response to insertion of an electrical wire and/or facilitating displacement of the first clip 124 in response to the second clip 126 engaging (e.g., pressing on) the first clip 124 upon insertion of the second clip 126 into the aperture 116.

As shown, each set 122 of wire-holding mechanisms 118 may be formed from a set 150 of apertures 116, a corresponding set 152 of first clips 124, and a corresponding set 154 of second clips 126, which are coupled to (and/or integrated with) a corresponding plate 138. In operation, the plate 138 may be configured to be coupled to the outer surface 140 of the back wall 110 such that the inner surface 142 of the plate 138 is positioned against the outer surface 140 of the back wall 110 and each of the set 154 of second clips 126 are at least partially inserted into a corresponding aperture 116 of the corresponding set 150 of apertures 116. Each of a corresponding set 152 of first clips 124 extends inwardly adjacent a corresponding aperture 116. When a second clip 126 is inserted at least partially into the corresponding aperture 116, it may be configured to engage the corresponding first clip 124, displacing the first clip 124. In embodiments, the second clip 126 is configured to be positioned adjacent to, without engaging, the first clip 124, when the plate 138 is coupled to the back wall 110. As shown in FIG. 4, the back wall 110 may further include one or more guide walls 156 disposed adjacent apertures 116 and configured to guide and/or support the corresponding second clip 126 upon insertion of the second clip 126 into the aperture 116.

According to embodiments, each of one or more electrical wires 120 may be inserted through a corresponding aperture 158 defined in the plate 138 prior to coupling the plate 138 to the back wall 110. In this manner, for example, embodiments of the invention facilitate a slide-in method of assembly, in which each set of corresponding clips 124, 126 are positioned to form the corresponding set of wire-holding mechanisms 118 and, in the same action (sliding the plate 138 into position on the back wall 110), each of the corresponding set of electrical wires 120 is retained in place. In embodiments, this operation may be a simpler solution for grabbing a number of electrical wires simultaneously than had been available in prior distribution panels. Embodiments of the distribution panel 100 may be configured to retain electrical wires, communication cables, fluid cables, and/or any number of other types of elongated objects such as cables, wires, tubes, and/or the like.

The illustrative distribution panel 100 shown in FIGS. 1-5 is not intended to suggest any limitation as to the scope of use or functionality of embodiments of the present disclosure. The illustrative distribution panel 100 also should not be interpreted as having any dependency or requirement related to any single component or combination of components illustrated therein. Additionally, various components depicted in FIGS. 1-5 may be, in embodiments, integrated with various ones of the other components depicted therein (and/or components not illustrated), all of which are considered to be within the ambit of the present invention.

Figure 6:
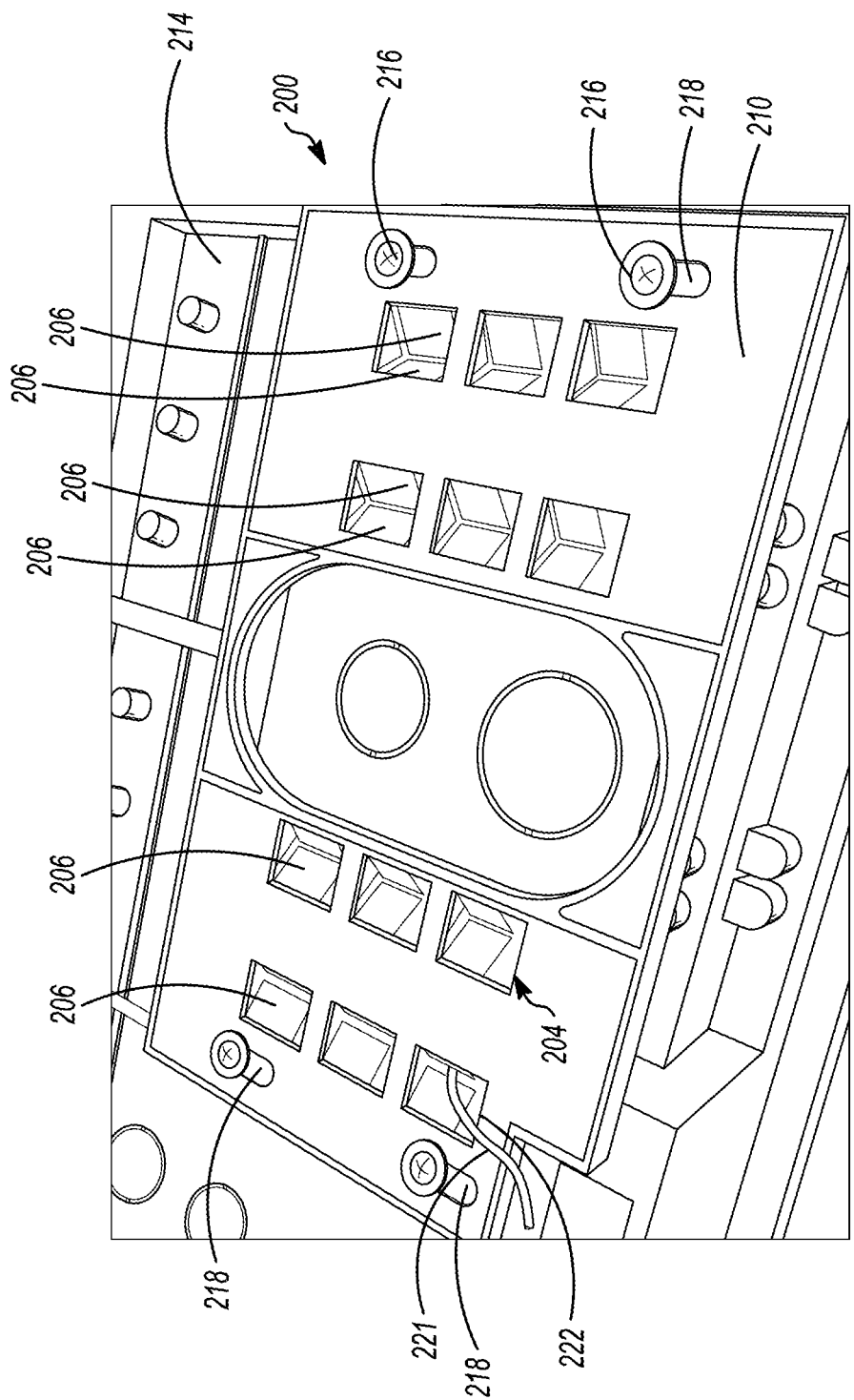
FIG. 6 is a close-up perspective view of an illustrative distribution panel, with the plate in the open position, in accordance with embodiments of the invention.
Figure 7:
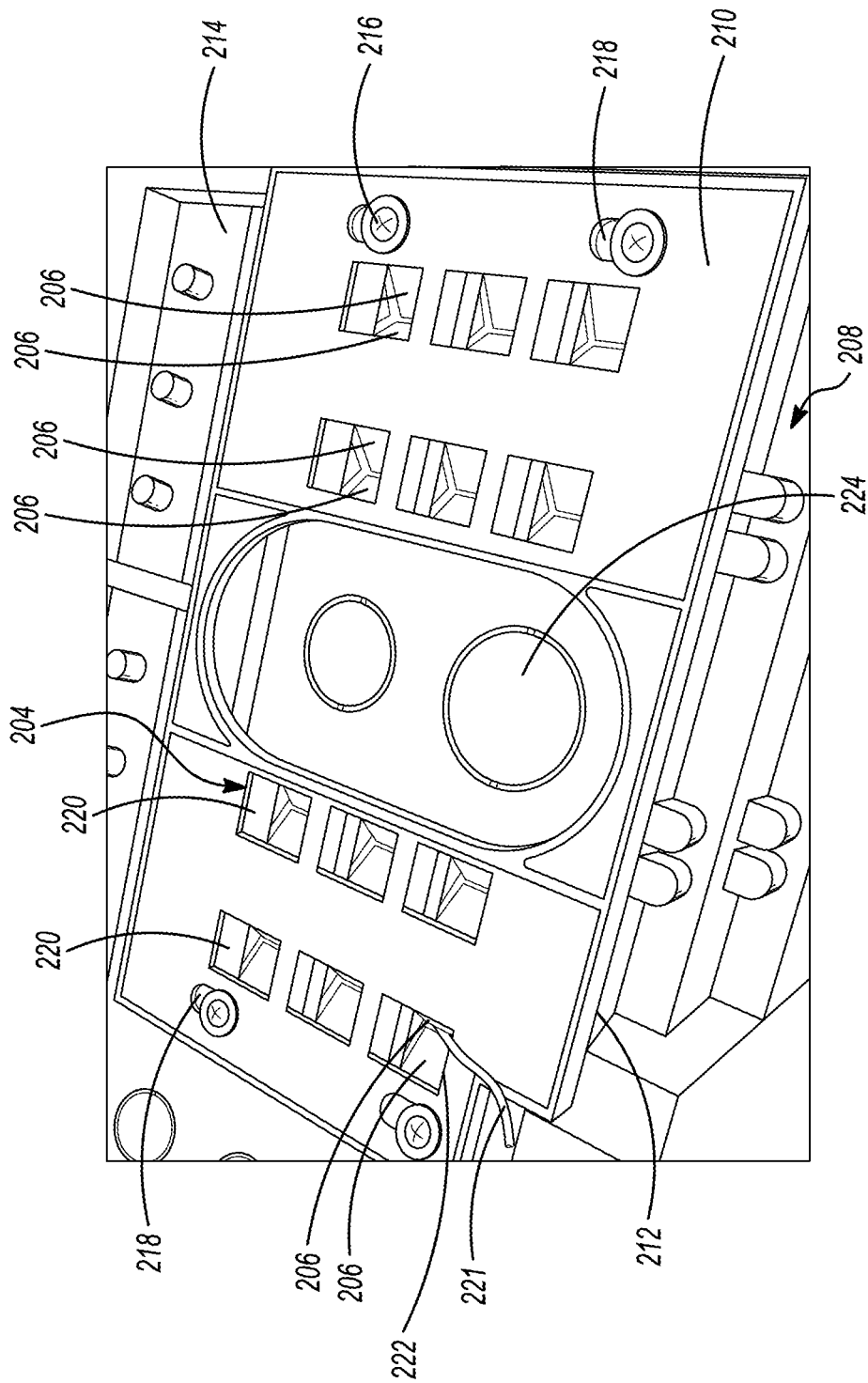
FIG. 7 is a close-up perspective view of the distribution panel of FIG. 6, with the plate in the closed position, in accordance with embodiments of the invention.

FIGS. 6 and 7 are perspective views of a portion of another illustrative distribution panel 200, showing in accordance with embodiments of the invention. According to embodiments, the distribution panel 200 may include any number of components that may be the same as, or similar to, components of the distribution panel 100 depicted in FIGS. 1-5. In contrast to the embodiments shown in FIGS. 1-5, the embodiments shown in FIGS. 6 and 7 include a set 202 of wire-holding mechanisms 204 in which both clips 206 are coupled to, or integrated with, the back wall 208. According to embodiments, the wire-holding mechanisms 204 depicted in FIGS. 6 and 7 may be include clips configured as described above, with reference to FIGS. 1-5. That is, for example, for each wire-holding mechanism, one clip may be oriented at an angle with respect to the back wall 208, while the other clip may be oriented approximately perpendicular to the back wall 208.

As shown in FIGS. 6 and 7, the distribution panel 200 includes a plate 210 configured to be mounted to the back wall 208 such that an inner surface 212 of the plate 210 is slideably positioned against an outer surface 214 of the back wall 208. In this illustrated embodiments, the plate 210 may be coupled to the back wall 208 via screws 216. A person of ordinary skill in the art would understand that the plate 210 could also be mounted inside the housing and/or by means other than screws 216. The plate 210 has slots 218 on opposite sides thereof and is configured to slide along the slots 218 in relation to the back wall 208. In the illustrated embodiments, the plate 210 includes four slots 218 with screws 216 running therethrough. However, in other embodiments the plate 210 could have two slots or more than four slots, depending on the configuration of the distribution panel 200. In another embodiment of the present invention the mounting is provided via a pair of rails on the back wall 208 within which the plate 210 slides.

In embodiments, as shown, the plate 210 includes one or more apertures 220, each of which at least approximately aligns with a corresponding wire-holding mechanism 204 (e.g., a strain relief). As shown in FIG. 6, when the plate 210 is in an open position, each aperture 220 and the corresponding wire-holding mechanism 204 fully align with each other, such that an electrical wire running through both the aperture 220 and the wire-holding mechanism 204 can freely move either towards or away from the interior of the distribution panel 200.

As shown in FIG. 7, when the plate 210 slides up relative to the back wall 208, and is in a closed position, there is only partial alignment between each aperture 220 and the corresponding wire-holding mechanism 204. As such, a side 222 of the aperture 220 pushes the electrical wire running through both the aperture 220 and the corresponding wire-holding mechanism 204 against the wire-holding mechanism 204; or an end of the wire-holding mechanism 204, thereby locking the electrical wire in place.

According to embodiments, the distribution panel 200 may further contain a grounding wire (not shown), and/or a feature such as a removable plug 224, a door (not shown), a lock (not shown), and/or the like. In embodiments, the use of one or more of these feature(s) makes it easier for the installer to customize the distribution panel for various uses, circuit elements, and/or the like.

When using embodiments of the distribution panel 200 of the present invention to secure an electrical wire, the plate 210 is put in the open position, and the electrical wire is inserted into an aperture 220 of the plate 210 and the corresponding wire-holding mechanism 204 of the back wall 208. The plate 210 slides in relation to the back wall 208 along the slots 218, such that a side 222 of the aperture 220 pushes the electrical wire against an end of the wire-holding mechanism 204, and the electrical wire is no longer movable within the wire-holding mechanism 204. Then the plate 210 is fixed in the closed position, for instance, by tightening the screws 216. Before sliding the plate 210 to the closed position, the position of the electrical wire can optionally be adjusted by pulling the electrical wire either towards or away from the interior of the distribution panel 200. After the position of the electrical wire is secured, the electrical wire can be connected to the one or more circuit elements inside the distribution panel 200.

The illustrative distribution panel 200 shown in FIGS. 6 and 7 is not intended to suggest any limitation as to the scope of use or functionality of embodiments of the present disclosure. The illustrative distribution panel 200 also should not be interpreted as having any dependency or requirement related to any single component or combination of components illustrated therein. Additionally, various components depicted in FIGS. 6 and 7 may be, in embodiments, integrated with various ones of the other components depicted therein (and/or components not illustrated), all of which are considered to be within the ambit of the present invention.

Various modifications and additions can be made to the exemplary embodiments discussed without departing from the scope of the present invention. For example, while the embodiments described above refer to particular features, the scope of this disclosure also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A distribution panel, comprising:
    a housing defining a hollow interior, the housing comprising:
        a back wall having at least a portion of a wire-holding mechanism disposed to pass an electrical wire therethrough into the interior of the distribution panel and to hold in place the electrical wire, the wire-holding mechanism including a first clip and a second clip configured to be positioned proximate the first clip to pinch the electrical wire to hold the electrical wire in place;
        an aperture defined in the back wall and configured to allow the electrical wire to pass therethrough into the interior;
        a front wall opposite the back wall;
        a top wall attached to the front wall and the back wall;
        a bottom wall opposite the top wall and attached to the front wall and the back wall;
        a left wall attached to the top wall, the back wall, and the front wall;
        a right wall opposite the left wall and attached to the top wall, the back wall, and the front wall; and
        a plate configured to be mounted to the back wall, the plate comprising an opening which is configured to align with the at least a portion of the wire-holding mechanism; and
    a circuit element disposed within the housing;
    wherein the first clip is coupled to, or integrated with, the back wall prior to coupling the plate to the back wall and the second clip is coupled to, or integrated with, the plate prior to coupling the plate to the back wall, and wherein, when the plate is coupled to the back wall, the second clip is partially inserted into a corresponding aperture in the back wall and positioned proximate the first clip to pinch the electrical wire to hold the electrical wire in place.

2. The distribution panel of claim 1, wherein the first clip is configured to extend away from the back wall toward the interior of the distribution panel at an angle and, wherein the first clip is configured to be flexible so as to be displaced in response to engagement by the wire and/or the second clip.

3. The distribution panel of claim 2, the back wall further comprising one or more guide walls disposed adjacent the aperture and configured to guide and/or support the second clip upon insertion of the second clip into the aperture.

4. The distribution panel of claim 1, wherein the wire-holding mechanism is disposed in the back wall, wherein the plate is slidable relative to the back wall, wherein the plate has an open position and a closed position, wherein when the plate is in the open position the electrical wire is movable within the wire-holding mechanism and wherein when the plate is in the closed position the electrical wire is locked in place.

5. The distribution panel of claim 4, wherein the electrical wire is movable towards and away from the interior of the distribution panel when the plate is in the open position.

6. The distribution panel of claim 4, wherein the opening comprises a side, and wherein when the plate is in the closed position the side pushes the electrical wire against the wire-holding mechanism such that the electrical wire is locked within the wire-holding mechanism.

7. The distribution panel of claim 4, wherein the plate comprises two slots on opposite sides of the plate, and wherein the plate slides along the two slots.

8. The distribution panel of claim 1, wherein the wire-holding mechanism is a strain relief.

9. The distribution panel of claim 1, wherein the distribution panel is selected from the group consisting of a fuse box, a circuit breaker box, a DC distribution box, and a combination thereof.

10. The distribution panel of claim 1, further comprising a feature selected from the group consisting of a removable plug, a grounding wire, a door, a lock, a DC distribution panel, and a combination thereof.

11. The distribution panel of claim 1, wherein the plate comprises a plastic, a metal, rubber, and a combination thereof.

12. The distribution panel of claim 1, wherein the circuit element is selected from a group consisting of a fuse holder, a fuse, a circuit breaker, an input/output connector, an alarm signal, a light emitting diode, an AC receptacle that is rated for 15 or 20 Amps, a ground bar and a combination thereof.

13. The distribution panel of claim 1, wherein the first clip is configured to extend away from the back wall toward the interior of the distribution panel at an acute angle and, wherein the second clip is configured to be positioned such that an outer surface of the second clip is at least approximately perpendicular to the back wall.

14. A building comprising a distribution panel, the distribution panel comprising:
    a housing defining an interior, the housing comprising:
        a back wall having at least a portion of a wire-holding mechanism disposed to pass an electrical wire therethrough into the interior of the distribution panel and to hold in place the electrical wire, the wire-holding mechanism including a first clip and a second clip configured to be positioned proximate the first clip to pinch the electrical wire to hold the electrical wire in place;
        an aperture defined in the back wall and configured to allow the electrical wire to pass therethrough into the interior;
        a front wall opposite the back wall;
        a top wall attached to the front wall and the back wall;
        a bottom wall opposite the top wall and attached to the front wall and the back wall;
        a left wall attached to the top wall, the back wall, and the front wall;
        a right wall opposite the left wall and attached to the top wall, the back wall, and the front wall; and
        a plate configured to be mounted to the back wall, the plate comprising an opening which is configured to align with the at least a portion of the wire-holding mechanism; and
    a circuit element disposed within the housing;

wherein the first clip is coupled to, or integrated with, the back wall prior to coupling the plate to the back wall and the second clip is coupled to, or integrated with, the plate prior to coupling the plate to the back wall, and wherein, when the plate is coupled to the back wall, the second clip is partially inserted into a corresponding aperture in the back wall and positioned proximate the first clip to pinch the electrical wire to hold the electrical wire in place.

15. The building of claim 14, wherein the wire-holding mechanism is disposed in the back wall, wherein the plate is slidable relative to the back wall, wherein the plate has an open position and a closed position, wherein when the plate is in the open position the electrical wire is movable within the wire-holding mechanism and wherein when the plate is in the closed position the electrical wire is locked in place.

16. A vehicle comprising a distribution panel, the distribution panel comprising:
   a housing defining an interior, the housing comprising:
      a back wall having at least a portion of a wire-holding mechanism disposed to pass an electrical wire therethrough into the interior of the distribution panel and to hold in place the electrical wire, the wire-holding mechanism including a first clip and a second clip configured to be positioned proximate the first clip to pinch the electrical wire to hold the electrical wire in place;
      an aperture defined in the back wall and configured to allow the electrical wire to pass therethrough into the interior;
      a front wall opposite the back wall;
      a top wall attached to the front wall and the back wall;
      a bottom wall opposite the top wall and attached to the front wall and the back wall;
      a left wall attached to the top wall, the back wall, and the front wall;
      a right wall opposite the left wall and attached to the top wall, the back wall, and the front wall; and
      a plate configured to be mounted to the back wall, the plate comprising an opening which is configured to align with the at least a portion of the wire-holding mechanism; and
   a circuit element disposed within the housing;
   wherein the first clip is coupled to, or integrated with, the back wall prior to coupling the plate to the back wall and the second clip is coupled to, or integrated with, the plate prior to coupling the plate to the back wall, and wherein, when the plate is coupled to the back wall, the second clip is partially inserted into a corresponding aperture in the back wall and positioned proximate the first clip to pinch the electrical wire to hold the electrical wire in place.

17. The vehicle of claim 16, wherein the vehicle is selected from the group consisting of a recreational vehicle, a boat, a camper, an airplane, a drone, an industrial vehicle and a combination thereof.

* * * * *